United States Patent
Miciuda et al.

(10) Patent No.: US 6,212,457 B1
(45) Date of Patent: Apr. 3, 2001

(54) MIXED PARALLEL AND DAISY CHAIN BUS ARCHITECTURE IN A VEHICLE SAFETY SYSTEM

(75) Inventors: Keith R. Miciuda, Grosse Pointe Park; Russell J. Lynch, West Bloomfield; Jon Kelly Wallace, Redford, all of MI (US)

(73) Assignee: TRW Inc., Lyndhurst, OH (US)

(*) Notice: Subject to any disclaimer, the term of this patent is extended or adjusted under 35 U.S.C. 154(b) by 0 days.

(21) Appl. No.: 09/369,109

(22) Filed: Aug. 5, 1999

(51) Int. Cl.$^7$ .................................................. B60R 21/32
(52) U.S. Cl. ........................ 701/45; 307/10.1; 280/735; 180/282
(58) Field of Search .................. 701/45, 46, 47, 701/48, 49; 280/728.1, 730.1, 734, 735; 180/274, 282; 340/438; 307/10.1

(56) References Cited

U.S. PATENT DOCUMENTS

| | | |
|---|---|---|
| 4,413,259 | 11/1983 | Lutz et al. . |
| 4,617,566 | 10/1986 | Diamond . |
| 4,746,918 | 5/1988 | Dijkers et al. . |
| 4,907,222 | 3/1990 | Slavik . |
| 4,942,571 | 7/1990 | Möller et al. . |
| 5,198,696 | 3/1993 | Dennis . |
| 5,428,760 | 6/1995 | Ghori et al. . |
| 5,675,189 | 10/1997 | Anma et al. . |
| 5,687,391 | 11/1997 | Judd et al. . |
| 5,821,632 | 10/1998 | Normann et al. . |
| 5,825,098 | 10/1998 | Darby et al. . |
| 5,835,873 | 11/1998 | Darby et al. . |
| 5,841,360 | 11/1998 | Binder . |
| 5,899,949 | * 5/1999 | Kincaid ................................ 280/735 |
| 5,964,815 | * 10/1999 | Wallace et al. ...................... 280/735 |
| 5,964,816 | * 10/1999 | Kncaid ................................ 340/438 |
| 6,002,974 | * 12/1999 | Schiffmann ........................... 701/45 |
| 6,037,674 | * 3/2000 | Hargedon et al. ................. 307/10.1 |
| 6,046,511 | * 4/2000 | Kincaid ............................. 307/10.1 |
| 6,070,114 | * 5/2000 | Fendt et al. ........................... 701/45 |
| 6,123,357 | * 9/2000 | Hosoda et al. ...................... 280/735 |

FOREIGN PATENT DOCUMENTS

WO 9722057   6/1997   (WO) .

OTHER PUBLICATIONS

An article entitled "Bus System for Wiring Actuators of Restraint Systems", Bauer et al., 96MJA208, date unknown.
An article entitled *Designing Computer systems Based on Multibus II*, New Electronics, dated Aug. 11, 1987, pp. 31–32.

* cited by examiner

Primary Examiner—Gary Chin
(74) Attorney, Agent, or Firm—Tarolli, Sundheim, Covell, Tummino & Szabo L.L.P.

(57) ABSTRACT

A distributed vehicle safety system (10) and an associated method provide for connection of a plurality of devices (14). Each of the devices (14) performs a function associated with protection of a vehicle occupant. A communication bus (16) conveys communication for the devices (14). The bus includes first and second conductors (18A and 18B). A first portion (subset K) of the devices (14) are daisy-chain connected, with respect to each other, along one (e.g., 18A) of the conductors of the bus (16). A second portion (subset L) of the devices (14) are connected in parallel across the first and second conductors (18A and 18B) of the bus (16). The second portion (subset L) contains at least one and preferably several devices (14).

18 Claims, 3 Drawing Sheets

MIXED PARALLEL AND DAISY CHAIN BUS ARCHITECTURE IN A VEHICLE SAFETY SYSTEM

TECHNICAL FIELD

The present invention is generally directed to a vehicle safety system, such as an occupant protection system, that has a central control unit and a plurality of remote devices. The present invention is particularly directed to a system with an architecture that can minimize potential communication interruptions.

BACKGROUND OF THE INVENTION

One type of vehicle safety system is an occupant protection system. The protection system includes one or more sensor devices for sensing vehicle characteristics and/or occupant characteristics. The sensed characteristics are used to determine whether a vehicle occupant needs to be protected (e.g., restrained) and/or determine a deployment profile of a device that accomplishes a protection function. Examples of the sensor devices include a vehicle acceleration sensor, an occupant position sensor, and an occupant weight sensor.

The system includes one or more actuatable protection devices for protecting (e.g., restraining) the occupant. Examples of such protection devices include an air bag module, a knee bolster module, and a seat belt pretensioner module.

As the sophistication of occupant protection systems has increased, the number and complexity of the sensor and protection devices in a single vehicle has increased. In response to the increased number and complexity of devices, there has been a movement toward centralized control of the devices to reduce cost and to increase reliability of the overall protection system. In order to accomplish the centralized control, a bus architecture is used for conveyance of communication signals. A potential exists that bus communication may be interrupted by such occurrences as crushing during a vehicle collision and associated deployment actuation of the protection devices within the system during the collision.

One type of protection system that has been developed utilizing centralized control and communication via a bus is a daisy chain topology system. Within the daisy chain system, at least one conductor of the communication bus extends through each successive device. Daisy chain topology has an advantage in that individual remote devices (e.g., sensor and protection devices) can be installed into the associated vehicle in a non-programmed state (e.g., unaddressed). Once the devices are installed, a central control unit (CCU) programs each device via sequential polling or the like. Thus, it is desirable to maintain an ability to have a CCU program devices.

SUMMARY OF THE INVENTION

In accordance with one aspect, the present invention provides a distributed vehicle safety system. The system includes a plurality of devices. Each of the devices performs a function associated with protection of a vehicle occupant. A bus means of the network conveys communication for the devices. The bus means includes first and second conductors. A first portion of the devices has a daisy chain connection topology along one of the conductors of the bus means, with respect to each other. A second portion of the devices has a parallel connection topology across the first and second conductors of the bus means, with respect to each other.

In accordance with another aspect, the present invention provides a distributed vehicle safety system that includes a plurality of devices. Each of the devices performs a function associated with protection of a vehicle occupant. Bus means conveys communication for the devices. The bus means includes first and second conductors. A portion of the devices are daisy chain connected, with respect to each other, along one of the conductors of the bus means. One of the devices is connected in parallel across the first and second conductors of the bus means.

In accordance with yet another aspect, the present invention provides a method of providing a distributed vehicle safety system. A communication bus that has first and second conductors is provided. A first plurality of devices is connected in daisy-chain topology along one of the conductors of the bus. Each of the first plurality of devices is capable of performing a function associated with protection of a vehicle occupant. A second plurality of devices is connected in parallel topology between the first and second conductors of the bus. Each of the second plurality of devices is capable of performing a function associated with protection of a vehicle occupant.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENTS

Figure 1:
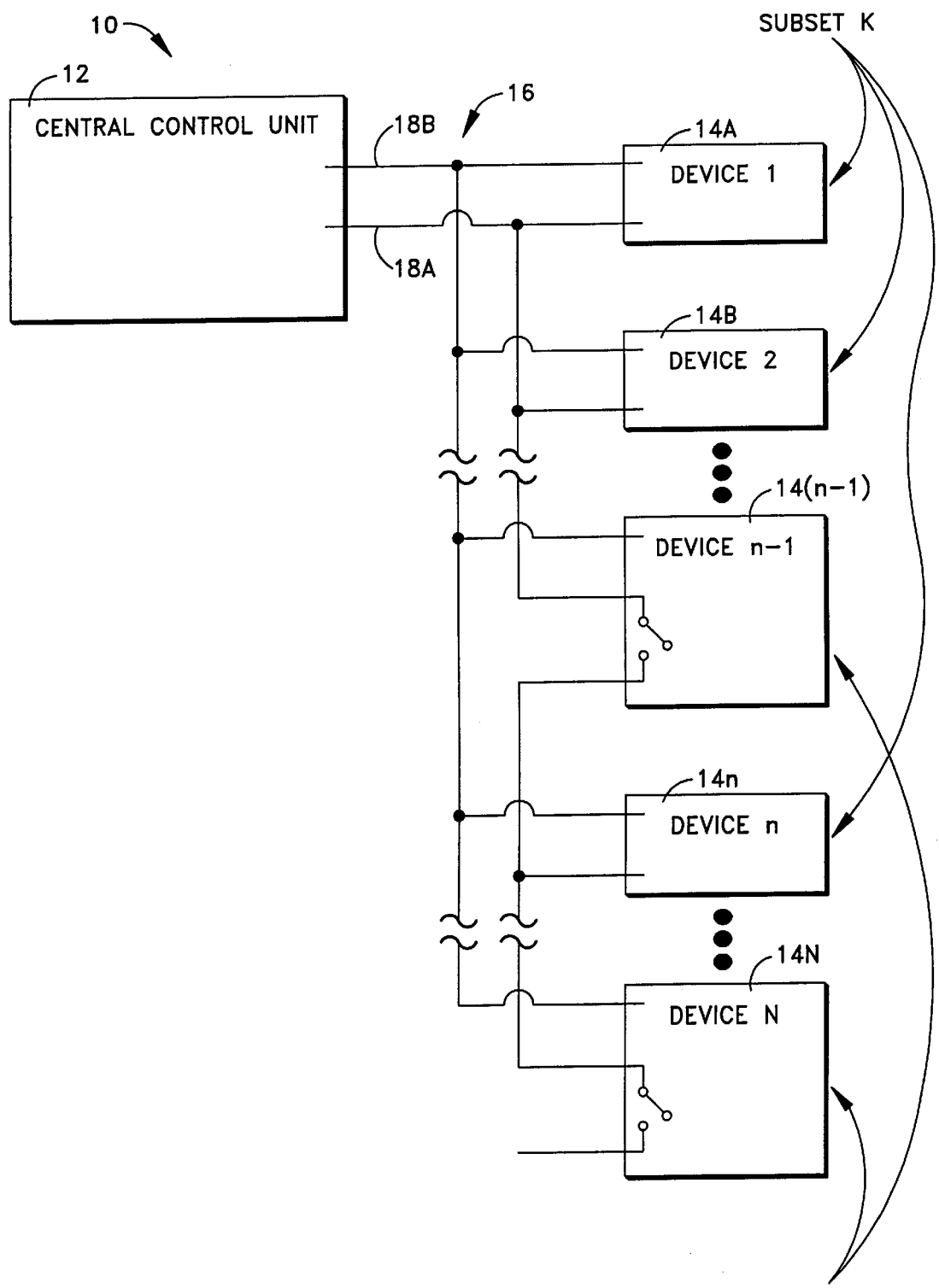
FIG. 1 is a schematic illustration of a system in accordance with the present invention.

A representation of the present invention is schematically shown in FIG. 1 as a distributed safety system 10. The system 10 includes a central control unit (hereinafter "CCU") 12 and a plurality (e.g., N) of remotely located devices 14. The plurality of devices 14 may be any combination of safety system devices, and are thus illustrated via generic blocks in FIG. 1.

A control interconnection 16 extends from the CCU 12 to the plurality of devices 14. Electrical communication signals, and preferably electrical energy for power, pass between the CCU 12 and the devices 14 via the control interconnection 16. The control interconnection 16 preferably is comprised of two electrically conductive connector lines 18A and 18B, and is hereinafter referred to as the bus 16.

Preferably, the system 10 is a vehicle occupant protection system for helping to protect an occupant (not shown) of a vehicle (not shown). Accordingly, the devices 14 are hereinafter generically referred to as protection system devices 14. Some of the protection system devices 14 are actuatable to help protect (e.g., restrain) the occupant, and some of the devices are used to determine control (e.g., actuation) of the actuatable protection devices.

Examples of actuatable protection devices include an air bag module, a knee bolster module, a seat belt lock, a seat belt pretensioner module, and a D-ring adjuster module. A person of ordinary skill in the art will appreciate that the actuatable protection devices may also have adjustable actuation variable(s). Such adjustable variables include deployment timing, air bag dynamic profile, pressure, etc.

Figure 2:
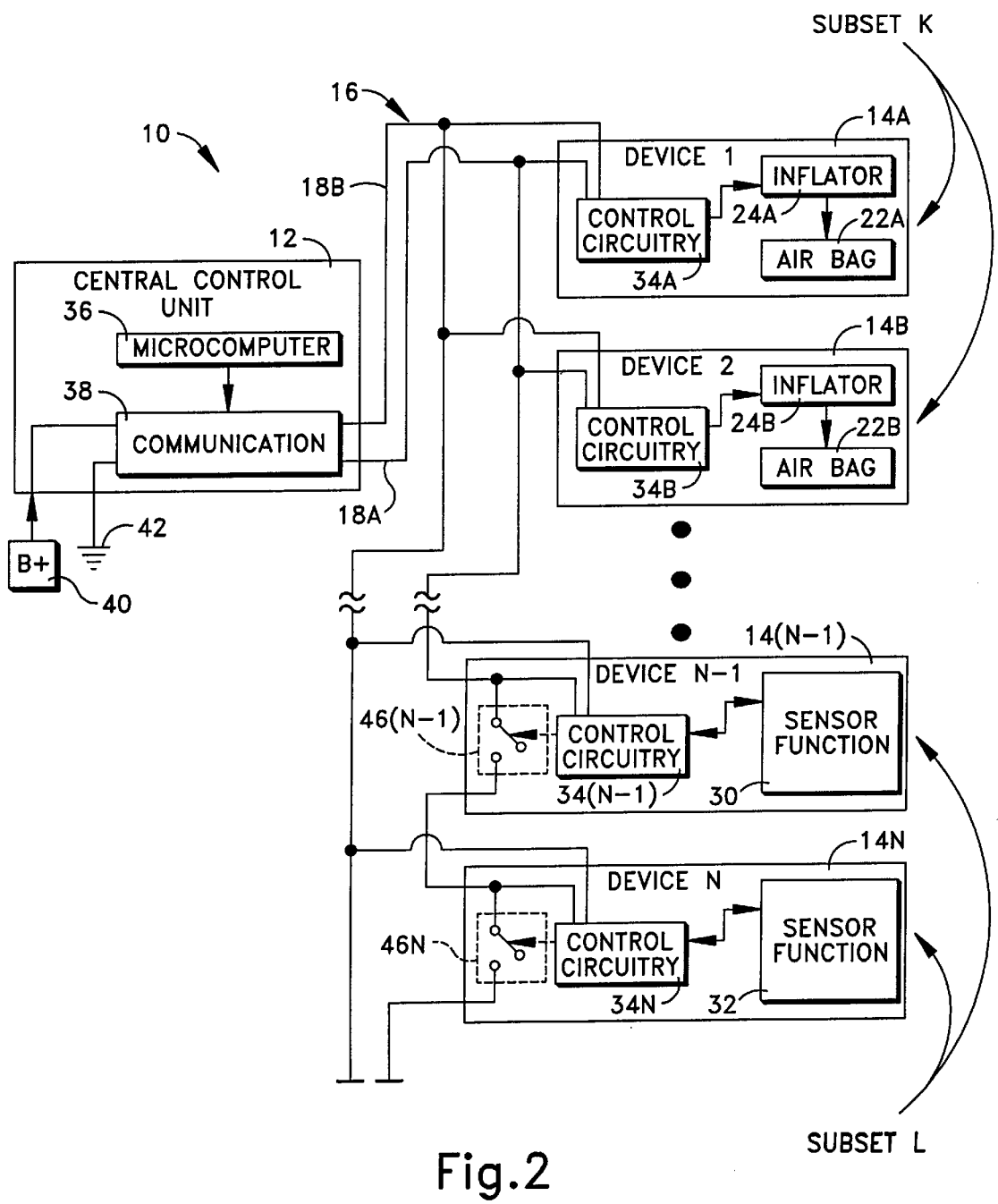
FIG. 2 is a schematic illustration of the system shown in FIG. 1 with example details shown for a central control unit and a select few remotely-located devices within the system.

For the purpose of illustration of the invention and not for the purpose of limitation, the specific example structure shown in FIG. 2 has occupant protection devices 14A and 14B that are air bag modules. Each air bag module includes an associated inflatable restraint 22, commonly referred to as an air bag. The air bag 22 is stored in a folded condition within the module in a manner well known in the art. A source 24 of inflation fluid (e.g., nitrogen gas) is provided to inflate the associated air bag 22. The source 24 of inflation fluid is commonly referred to as an inflator, and includes a stored quantity of pressurized inflation fluid and/or an inflation fluid generating material. The inflator 24 has an associated igniter (e.g., a pyrotechnic squib), which is electrically activated to initiate flow of the inflation fluid from the inflator. The flow of inflation fluid to the air bag 22 inflates the air bag, as will be appreciated by a person of ordinary skill in the art.

The protection system devices 14 that are involved in the determination of control (e.g., actuation) of the actuatable protection devices include sensor devices. Each sensor device senses a characteristic that is used to determine whether the additional protection help (e.g., air bag restraint of occupant) is to be provided (e.g., actuation deployment of one or more of the actuatable protection devices) and/or how the additional protection help is to be provided (e.g., adjustment of deployment of one or more of the actuatable protection devices). Thus, the sensor devices perform a function associated with protection of a vehicle occupant.

Examples of sensor devices include a vehicle crash sensor (e.g., an accelerometer), an occupant position sensor (e.g., an ultrasound or an infrared sensor), and an occupant weight sensor (e.g., a pressure sensor). The example shown within FIG. 2 contains two protection system devices 14(N-1) and 14N that are sensor devices. For the purpose of illustration only and not for the purpose of limitation, the first sensor device 14(N-1) is an occupant characteristic sensor (e.g., an ultrasonic sensor) with an occupant characteristic sensor function 30, and the second sensor device 14N is a vehicle characteristic sensor (e.g., an accelerometer) with a vehicle characteristic sensor function 32.

Each of the protection system devices 14 has control circuitry 34 for communication via the bus 16 and for control of function(s) at the respective device. For example, at the actuatable occupant protection devices (e.g., 14A), the control circuitry (e.g., 34A) receives actuation command communication from the CCU 12, and causes actuation. At the sensor devices (e.g., 14N), the control circuitry (e.g., 34N) assembles sensory information and provides communications that conveys the sensory information to the CCU 12.

It is to be appreciated that the protection system devices 14 of the illustrated example are individually identified herein via alphabetic suffixes and that the devices have some elements that are identified by numbers with corresponding alphabetic suffixes. Herein, the alphabetic suffixes are sometimes omitted for generic discussions (i.e., applicable to all of the referenced numbered elements).

The CCU 12 receives the sensory input from the sensor devices (e.g., 14N) and using the sensory input regarding the sensed characteristics makes determinations regarding protection device control. In one example, the CCU 12 analyzes the information derived from the sensed characteristics and determines if a deployment crash condition is occurring (e.g., the CCU performs a crash algorithm). A deployment crash condition is one in which deployment of one or more protection devices is desirable to hopefully, in combination with other vehicle systems (e.g., seat belts or the like), enhance protection of the occupant. Preferably, the CCU 12 includes a microcomputer 36 to perform the analysis/determination function. Also, a person of ordinary skill in the art will appreciate that if the actuatable occupant protection devices (e.g., 14A) have adjustable aspects (adjustable to tailor deployment actuation of the respective protection device) the CCU 12 determines adjustment, and controls the adjustment of the deployment variable(s) accordingly.

At the CCU 12, the receipt of the sensory signals, the provision of control signals, and the receipt/provision of other signals is via a communication portion 38 of the CCU 12 that is connected to the bus 16. The communication portion 38 is connected to the microcomputer 36 and other portion(s) (not shown) of the CCU 12. Preferably, the communication portion 38 of the CCU 12 is connected to both a vehicle power source 40 (i.e., the vehicle battery) and to vehicle ground 42 for provision of electrical power for the plurality of protection system devices 14, via the bus 16. Any known method of providing electrical power and communication signals over the same electrical interconnection(s) can be employed within the system 10. Thus, the known methods of electrical power and communication signal provision are not discussed in detail herein.

In accordance with the present invention and as is schematically shown in the figures, the bus 16 is connected to the protection system devices 14 via a combination of parallel connections and daisy chain connections. Specifically, a first portion (of number K, with K<N, and referred to herein as "subset K") of the protection system devices 14 are merely connected in parallel between the two connector lines 18A and 18B.

A second portion (of number L, with L<N, and referred to herein as "subset L") of the protection system devices 14 have a daisy chain connection along one of the two connector lines (e.g., 18A). Each daisy chain connection entails connection of the connector line 18A through the respective device (e.g., 14N-1)). Each of the daisy chain devices (subset L) is also connected to the other connector line 18B.

In the illustrated example, the two subsets K and L comprise the entire group of protection system devices. The number of protection system devices within any one subset is any number less than the total number of devices (i.e., less that N), with the other subset comprising the remainder. The devices of the two subsets K and L can occur in any order, and can even intermingle as shown in the example. Thus, the devices of one subset (e.g., K) are interspersed among the devices of the other subset (e.g., L) along the bus 16.

Focusing now on the two connector lines 18A and 18B of the bus 16, the connector lines are connected to each of the protection system devices (i.e., each of the devices in each of the subsets K and L). For the connector line 18A that is associated with the daisy chain topology, an electronic switch 46 is interposed along the connector line for each daisy-chained device. In other words, a switch (e.g., 46(N-1)) on the connector line 18A is associated with each protection system device (e.g., 14(N-1)) of the subset L. Each electronic switch 46 has an "ON" or "CLOSED" state, and an "OFF" or "OPENED" state. In its ON state each switch (e.g., 46(N-1)) permits electrical flow (e.g., signals and energy) through the switch, and in its OFF state each switch blocks/interrupts electrical flow.

In the illustrated embodiment, the switches 46 are shown within the respective protection system devices 14 of the subset L. A person of ordinary skill in the art will appreciate that the switches 46 can be separate from the respective protection system devices, and yet be associated with the respective device.

Each switch (e.g., 46(N-1)) associated with a protection system device (e.g., 14(N-1)) is interposed between the CCU 12 and all of the protection system devices 14, if any, that are "downstream" of the particular protection system device (e.g., 14(N-1)). It should be appreciated that the nomenclature "downstream" is with reference to a direction away from the CCU 12, and proceeding toward a last protection system device 14N connected on the bus 16. Within each of the protection system devices 14 of the subset L, both of the connector lines 18A and 18B are connected to the control circuitry 34 of the respective device. Thus, the CCU 12 can communicate with, and supply power to, the control circuitry 34 of a respective protection system device so long as all of the upstream switches 46, if any, are closed. In turn, the control circuitry 34 controls the associated switch 46.

Protection system devices 14 that are daisy chain connected (i.e., the subset L) can be non-programmed (e.g., unaddressed) upon installation into a vehicle. Specifically, if the protection system devices 14 in the subset L have open switches 46 until programmed, then the CCU 12 merely has to poll the protection system devices that are able to communicate to determine which device is non-programmed.

Recall that until programmed, the protection system devices 14 in the subset L have open switches 46. Thus, only one non-programmed protection system device (e.g., 14(N-1)) of the subset L can engage in communication (i.e., be polled and programmed) with the CCU 12 at a time (i.e., only the upstream-most device of the subset L can communicate because its associated switch 46 prevents the downstream devices from engaging in communication). When the programming of the one device (e.g., 14(N-1)) is complete, its associated switch (e.g., 46(N-1)) is closed and communication can then reach downstream device(s) up to the next open switch (i.e., at the next one of the devices in the subset L).

Turning to the subset K, these protection system devices (e.g., 14A and 14B) typically must be preprogrammed (i.e., pre-addressed) prior to installation. The CCU 12 can immediately communicate with the preprogrammed devices. Preprogramming is preferred because it is possible that a plurality of non-preprogrammed devices of the subset K would be capable of communicating with the CCU 12 (e.g., several non-preprogrammed devices located upstream of a first switch 46). Thus, preprogramming avoids the need for a special communication arbitration scheme that would allow the CCU to sequentially program such a plurality of devices.

A benefit of the parallel connection topology (subset K) is that a communication-disrupting event at any of the protection system devices in the subset K does not effect communication to the rest of the protection system devices. For example, if the control circuitry (e.g., 34A) of one of the parallel-connected devices (e.g., 14A) is damaged such as upon actuation of the device, communication on the bus 16 is not interrupted because the control circuitry of the parallel-connected device is not involved with switch control (no switch is associated with the device).

Figure 3:
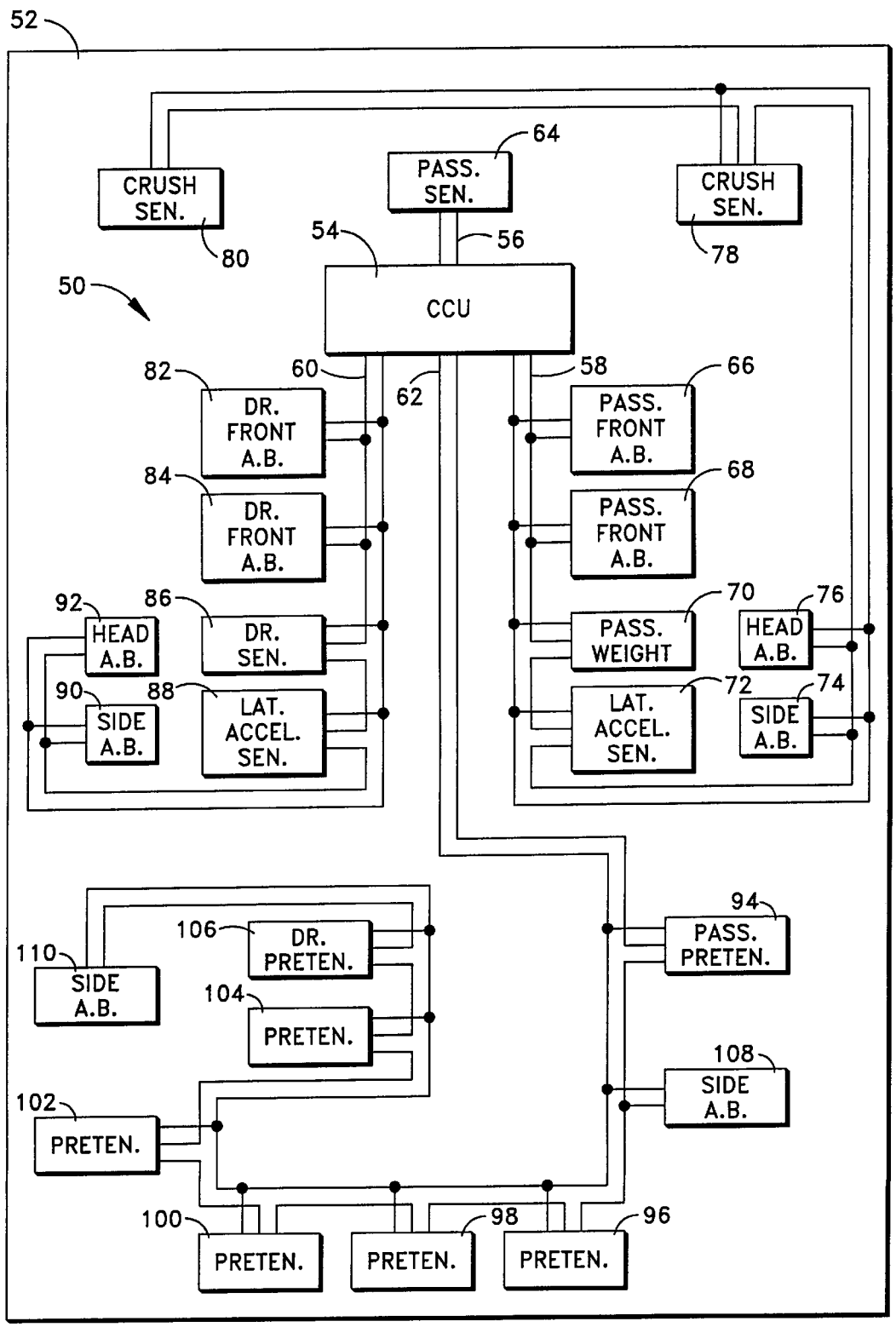
FIG. 3 is a schematic illustration of an example of a system in accordance with the present invention within an associated schematically shown vehicle.

It should be appreciated that the present invention may be utilized in various forms and configurations. An example of a system 50 within a vehicle 52 in accordance with the present invention is shown in FIG. 3. Within the system 50 of FIG. 3, a CCU 54 is provided to communicate via four communication interconnections ("buses") 56–62. The first bus 56 only communicates with a single device 64. The single device 64 is a passenger sensor for sensing a passenger (not shown).

The second bus 58 provides communication for first and second passenger front air bag devices 66 and 68 (i.e., a torso bag and a knee bolster). The first and second passenger front air bag devices 66 and 68 are connected in parallel to the second bus 58. A passenger weight sensor 70 and a vehicle lateral acceleration sensor 72 are connected in daisy-chain configuration to the second bus 58. A passenger side air bag device 74 and a head air bag device 76 are connected in parallel to the second bus 58. Two frontal crush sensors 78 and 80 are connected in daisy-chain fashion to the second bus 58.

The third bus 60 has two driver front air bag devices 82 and 84 that are connected in parallel. A driver sensor 86 (i.e., a position sensor) and a vehicle lateral acceleration sensor 88 are connected in daisy-chain topology to the third bus 60. A side air bag device 90 and a head air bag device 92 are connected in parallel to the third bus 60.

The fourth bus 62 provides for communication from the CCU 54 to seven seat belt pretensioners 94–106 (i.e., one associated with the driver seat and one associated with each of six passenger seats). The fourth bus 62 also serves two side air bag devices 108 and 110. The air bag devices 108 and 110 are associated with passenger seat locations in a second seating group (not shown) within the vehicle. The pretensioner devices 94-106 are all connected in daisy-chain topology. The side air bag devices 108 and 110 are connected in parallel topology.

From the above description of the invention, those skilled in the art will perceive improvements, changes and modifications. Such improvements, changes and modifications within the skill of the art are intended to be covered by the appended claims.

Having described the invention, the following is claimed:

1. A distributed vehicle safety system comprising:
   a plurality of devices, each for performing a function associated with protection of a vehicle occupant; and
   bus means for conveying communication for said devices, said bus means including first and second conductors;
   a first portion of said devices being daisy-chain connected, with respect to each other, along one of said conductors of said bus means;
   a second portion of said devices being connected in parallel, with respect to each other, across said first and second conductors of said bus means.

2. A system as set forth in claim 1, including a switch associated with each of said devices of said first portion, each of said devices of said first portion includes means for controlling said associated switch, each switch being located along said one of said conductors of said bus means.

3. A system as set forth in claim 2, wherein each of said devices of said first portion is programmable, each of said means for controlling includes means for closing said associated switch once said associated device is programmed.

4. A system as set forth in claim 1, including a central control unit connected to said bus means, and each of said devices includes control circuitry for communicating with said central control unit.

5. A system as set forth in claim 1, wherein said devices includes an actuatable occupant protection device.

6. A system as set forth in claim 5, wherein said devices includes a sensor device for sensing a condition for which an occupant is to be protected.

7. A system as set forth in claim 1, wherein said first portion of said devices includes an actuatable air bag device, said second portion of said devices includes a sensor for sensing a condition for which said air bag device is to be actuated.

8. A system as set forth in claim 1, wherein said first portion of said devices is interspersed among said second portion of said devices.

9. A distributed vehicle safety system comprising:

a plurality of devices, each for performing a function associated with protection of a vehicle occupant; and bus means for conveying communication for said devices, said bus means including first and second conductors;

a portion of said devices being daisy chain connected, with respect to each other, along one of said conductors of said bus means;

one of said devices being connected in parallel across said first and second conductors of said bus means.

10. A system as set forth in claim 9, including a switch associated with each of said daisy-chain connected devices, each of said daisy-chain connected devices includes means for controlling said associated switch, each switch being located along said one of said conductors of said bus means.

11. A system as set forth in claim 10, wherein each of said daisy-chain connected devices is programmable, each of said means for controlling includes means for closing said associated switch once said associated device is programmed.

12. A system as set forth in claim 9, including a central control unit connected to said bus means, and each of said devices includes control circuitry for communicating with said central control unit.

13. A system as set forth in claim 9, wherein said devices includes an actuatable occupant protection device.

14. A system as set forth in claim 13, wherein said devices includes a sensor for sensing a condition for which an occupant is to be protected.

15. A system as set forth in claim 9, wherein said parallel-connected device is an actuatable air bag device, said daisy-chain connected devices include a sensor for sensing a condition for which said air bag device is to be actuated.

16. A method of providing a distributed vehicle safety system comprising:

providing a communication bus having first and second conductors;

connecting a first plurality of devices, which are capable of performing a function associated with protection of a vehicle occupant, in daisy-chain topology along one of the conductors of the bus; and connecting a second plurality of devices, which are capable of performing said function associated with protection of a vehicle occupant, in parallel topology between the first and second conductors of the bus.

17. A method as set forth in claim 16, including programming the second plurality of devices via communication from a central control unit through the bus.

18. A method as set forth in claim 17, including closing switches located along the one of the conductors of the bus and associated with the second plurality of devices in response to the programming.

* * * * *